(12) United States Patent
Horton

(10) Patent No.: US 9,796,623 B2
(45) Date of Patent: Oct. 24, 2017

(54) SYSTEMS AND METHODS FOR AFFECTING A WALL REPAIR

(71) Applicant: Walter Horton, Orem, UT (US)

(72) Inventor: Walter Horton, Orem, UT (US)

(73) Assignee: Walter J. Horton, Orem, UT (US)

( * ) Notice: Subject to any disclaimer, the term of this patent is extended or adjusted under 35 U.S.C. 154(b) by 0 days.

(21) Appl. No.: 14/799,466

(22) Filed: Jul. 14, 2015

(65) Prior Publication Data

US 2016/0009595 A1 Jan. 14, 2016

Related U.S. Application Data

(60) Provisional application No. 62/023,956, filed on Jul. 14, 2014.

(51) Int. Cl.
*E04G 23/02* (2006.01)
*C04B 11/00* (2006.01)

(52) U.S. Cl.
CPC .......... *C04B 11/00* (2013.01); *E04G 23/0207* (2013.01); *E04G 23/02* (2013.01); *E04G 23/0203* (2013.01)

(58) Field of Classification Search
CPC . E04G 23/02; E04G 23/0203; E04G 23/0207; E04G 23/0214
USPC ................................................. 52/514, 514.5
See application file for complete search history.

(56) References Cited

U.S. PATENT DOCUMENTS

| | | | | | |
|---|---|---|---|---|---|
| 4,193,243 | A | * | 3/1980 | Tiner | E04G 23/0203 156/98 |
| 4,285,183 | A | * | 8/1981 | Condit | E04G 23/0203 52/514 |
| 4,370,842 | A | * | 2/1983 | Martin | E04G 23/0203 52/514 |
| 4,776,906 | A | * | 10/1988 | Bernard | B29C 63/02 156/256 |
| 4,809,478 | A | * | 3/1989 | Bernard | E04G 23/0203 52/309.4 |
| 4,948,835 | A | * | 8/1990 | Artykov | C08F 20/06 524/704 |
| 2003/0162866 | A1 | * | 8/2003 | Prat | C04B 24/003 524/2 |
| 2015/0197950 | A1 | * | 7/2015 | Lewis | E04G 23/0207 52/514.5 |
| 2015/0216182 | A1 | * | 8/2015 | Brown | A01N 57/16 424/405 |

* cited by examiner

*Primary Examiner* — Phi A
(74) *Attorney, Agent, or Firm* — Kunzler, PC

(57) ABSTRACT

A repair plaster powder for repairing drywall. The repair plaster powder includes gypsum plaster and crystalline silica. The repair plaster powder also includes calcium carbonate and calcium hydroxide.

18 Claims, 3 Drawing Sheets

SYSTEMS AND METHODS FOR AFFECTING A WALL REPAIR

CROSS-REFERENCE TO RELATED APPLICATIONS

This application claims the benefit of and priority to U.S. Provisional Patent Application Ser. No. 62/023,956 filed on Jul. 14, 2014, which application is incorporated herein by reference in its entirety.

BACKGROUND OF THE INVENTION

Drywall repair often takes a level of technical expertise. In particular, repair often constitutes using a spackle to fill in any holes in the drywall. The spackle must be applied fairly evenly and with a surface that matches the texture of the underlying wall. That is, if the wall includes texturing then the spackle must be likewise textured. In addition, the spackle is not as strong as the original drywall. This is because the spackle lacks elements, such as the surrounding paper, that lends strength to the drywall. Finally, when spackle dries it loses a small amount of volume. This leads to cracking and splitting. Therefore, a user must often apply multiple layers of spackle to anything larger than pinhole repairs to fill in cracks and gaps created by the drying of the previous spackle applications.

Further, larger repairs are often impossible to complete using only spackle. Those repairs require removal of drywall to expose studs, cutting of drywall, hanging of the drywall, taping of any seams and then spackling to cover the taped seams and/or create a final texture. This is far beyond the ability of an average user to complete and he/she must, therefore, hire someone to complete the repair.

Accordingly, there is a need in the art for a wall repair kit that allows a user to complete a drywall repair without extensive technical expertise. Further, there is a need in the art for the repair to harden without cracking.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a repair plaster powder for repairing drywall. The repair plaster powder includes gypsum plaster and crystalline silica. The repair plaster powder also includes calcium carbonate and calcium hydroxide.

Another example embodiment includes a kit for affecting a drywall repair. The kit includes a repair plaster powder for repairing drywall. The repair plaster powder includes gypsum plaster, crystalline silica, calcium carbonate, calcium hydroxide, kaolin, hydroxypropyl methyl cellulose, ethylene vinyl acetate, carboxymethylcellulose, and stabilizing agents. The repair plaster powder produces a repair plaster when mixed with water. The kit also includes one or more adhesive sticks. The one or more adhesive sticks are configured to be placed on a rear surface of a drywall panel and provide structural support for the repair.

Another example embodiment includes a method for affecting drywall repair. The method includes providing a repair plaster powder. The repair plaster powder includes gypsum plaster, crystalline silica, calcium carbonate, calcium hydroxide, kaolin, hydroxypropyl methyl cellulose, ethylene vinyl acetate, carboxymethylcellulose, and stabilizing agents. The method also includes mixing the repair plaster powder with water to create a repair plaster; and placing one or more adhesive sticks on a rear surface of a drywall panel behind a break in the drywall panel. The method further includes placing any remaining rear paper from the drywall panel approximately the original position by adhering it to the one or more adhesive sticks. The method additionally includes placing the repair plaster in the break in the drywall panel and allowing the repair plaster to harden. The repair plaster powder is configured to avoid cracking due to shrinking during the hardening process.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
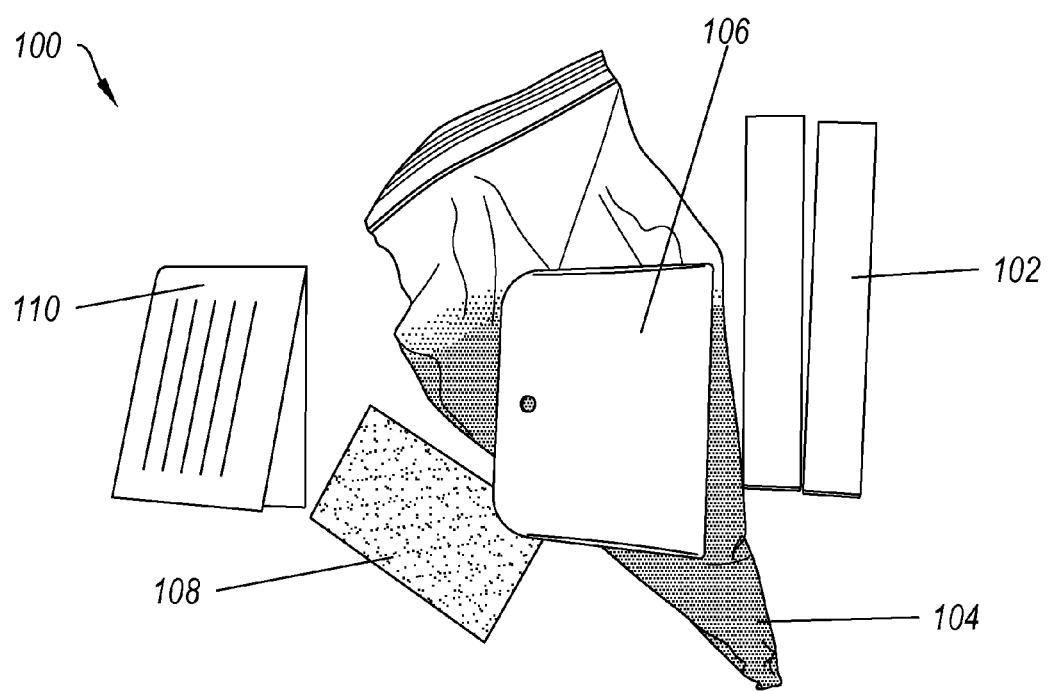
FIG. 1 illustrates an example of a kit for repairing a hole in drywall.

FIG. 1 illustrates an example of a kit 100 for repairing a hole in drywall. Drywall (also known as plasterboard, wallboard, gypsum board) is a panel made of gypsum plaster pressed between two thick sheets of paper. It is used to make interior walls and ceilings. Drywall construction has become prevalent as a speedier alternative to traditional lath and plaster. A wallboard panel of drywall consists of a layer of gypsum plaster (plaster of Paris) sandwiched between two layers of paper. The raw gypsum, $CaSO_4.2H_2O$, is heated to drive off the water then slightly re-hydrated to produce the hemihydrate of calcium sulfate ($CaSO_4.\frac{1}{2}H_2O$) and mixed with additives if desired. The board is then formed by sandwiching a core of the wet mixture between two sheets of heavy paper or fiberglass mats. When the core sets it is then dried in a large drying chamber, and the sandwich becomes rigid and strong enough for use as a building material. Much of the structural support for drywall comes from the paper surrounding the plaster. Therefore, the kit 100 becomes structurally attached to the paper and plaster, thus ensuring a strong repair that blends with the existing wall.

FIG. 1 shows that the kit 100 can include one or more adhesive sticks 102. The one or more adhesive sticks 102 are configured to adhere to the existing drywall and/or any remaining paper within the break. In particular, the adhesive sticks 102 allow the remaining paper of the drywall to be placed where it was before the damage to the drywall. For example, the backer paper can be removed from an adhesive stick 102, the adhesive stick 102 can be placed through the hole and attached to the rear of the drywall. The paper can then be attached to the adhesive of the adhesive stick 102 so that the paper forms a complete, or as complete as possible, surface on the rear of the damaged section. If the original paper is not present or does not fill the whole break then other materials may be attached to the adhesive stick 102. For example, a piece of cardboard may be cut to match the hole and then secured using the adhesive sticks 102. This provides a rear surface to the repair that is similar to the original papter backing. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. As a result, the phrase "configured to" reaches well beyond merely describing functional language or intended use since the phrase actively recites an actual state of configuration.

FIG. 1 also shows that the kit 100 can include repair plaster powder 104. The repair plaster powder 104 is used to replace the missing gypsum plaster. The formulation of the repair plaster powder 104 can be critical to ensure that the repair is completed properly. In particular, the repair plaster powder 104 should be strong enough to affect the repair, should not shrink in order to prevent cracking, and should dry soon enough that the user can perform finishing tasks (such as sanding, painting, etc.). For example, the repair plaster powder 104 can include the following components (all percentages are by weight): approximately 75% Plaster of Paris; approximately 10% Crystalline Silica; approximately 10% Calcium carbonate; and approximately 5% calcium hydroxide. Additionally, in order to create desired properties in either the repair plaster powder 104, resulting wet repair plaster or finished repair plaster the following can be added: approximately 0.5% kaolin; approximately 0.02% Hydroxypropyl Methyl Cellulose (HPMC); 0.04% Ethylene vinyl acetate (EVA); 0.5% carboxymethylcellulose (CMC); and stabilizing agents. As used in the specification and the claims, the term approximately shall mean that the value is within 10% of the stated value, unless otherwise specified.

Crystalline silica is a basic component of soil, sand, granite, and many other minerals. Quartz is the most common form of crystalline silica. Cristobalite and tridymite are two other forms of crystalline silica. Calcium carbonate is a chemical compound with the formula $CaCO_3$ and CAS Registry Number 471-34-1. Calcium hydroxide (or ash calcium powder), traditionally called slaked lime, is an inorganic compound with the chemical formula $Ca(OH)2$ and CAS Registry Number 1305-62-0. It is a colorless crystal or white powder and is obtained when calcium oxide (called lime or quicklime) is mixed, or "slaked" with water. It has many names including hydrated lime, builders' lime, slack lime, cal, or pickling lime. Kaolin, or China clay, is nearly white in color. The primary constituent in kaolin is the mineral kaolinite, a hydrous aluminum silicate formed by the decomposition of minerals such as feldspar. HPMC (or Hypromellose) is a semisynthetic, inert, viscoelastic polymer with a CAS Registry Number of 9004-65-3. HPMC acts as an emulsifier, thickening and suspending agent. Ethylene-vinyl acetate (EVA), also known as poly(ethylene-vinyl acetate) (PEVA), is the copolymer of ethylene and vinyl acetate. The weight percent vinyl acetate usually varies from 10 to 40%, with the remainder being ethylene. EVA acts as a thickening agent. CMC (or cellulose gum) is a cellulose derivative with carboxymethyl groups ($-CH_2-COOH$) bound to some of the hydroxyl groups of the glucopyranose monomers that make up the cellulose backbone. It is often used as its sodium salt, sodium carboxymethyl cellulose. In chemistry a stabilizer is a chemical which tends to inhibit the reaction between two or more other chemicals. The term can also refer to a chemical that inhibits separation of suspensions, emulsions, and foams.

The repair plaster powder 104 can be mixed with water to create a repair plaster that is placed in the break in the drywall to affect the repair. That is, the repair plaster powder 104 is mixed with the appropriate amount of water creating a repair plaster that is then placed within the break in the drywall. When the repair plaster cures it forms a hard repair that is indistinguishable by look from the existing drywall. Likewise the finished repair plaster can be finished in a similar manner to drywall.

FIG. 1 further shows that the kit 100 can include a spreader 106. The spreader 106 is configured to spread the repair plaster in the drywall break and to create a moderately flat surface. That is, the spreader 106 both can be used to place repair plaster in the break and the flat edge can be used to create an approximately flat surface.

FIG. 1 additionally shows that the kit 100 can include sandpaper 108. Sandpaper 108 is a generic name used for a type of coated abrasive that consists of a heavy paper with abrasive material attached to its surface. Sandpaper is produced in different grit sizes and is used to remove small amounts of material from surfaces. The sandpaper 108 creates a smooth surface which is the available for additional finishing by the user.

FIG. 1 moreover shows that the kit 100 can include instructions 110. The instructions 110 can include information about the kit 100 and how it can be best used to affect the desired repair. Additionally or alternatively, the instructions 110 can include information about where instructions can be found. I.e., the instructions 110 can include a website or other information that will tell a user where to find required information such as instructional videos.

Figure 2:
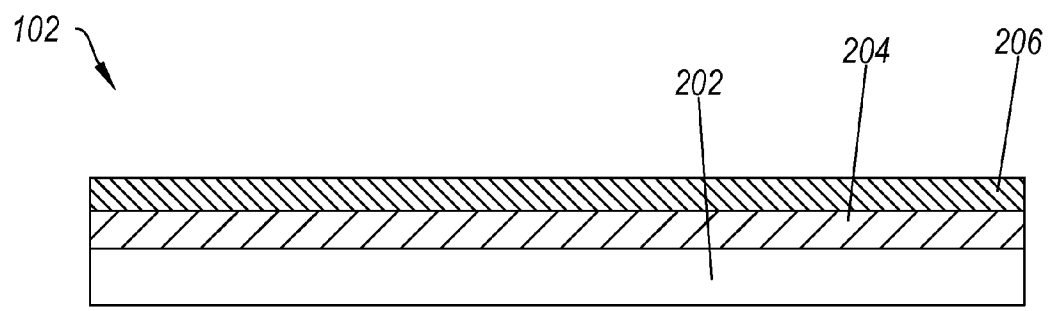
FIG. 2 illustrates an example of an adhesive stick.

FIG. 2 illustrates an example of an adhesive stick 102. The adhesive stick 102 is configured to be placed at the rear of a drywall repair. In particular, the adhesive stick 102 secures to the existing drywall providing back support to the repair material. Additionally or alternatively, the adhesive stick 102 allows the paper on the rear of the drywall to be preserved to strengthen and ease the repair.

FIG. 2 shows that the adhesive stick 102 can include a body 202. The body 202 provides structural support. I.e., the body 202 is the portion of the adhesive stick which provides strength to the repair. The body 202 can be made of any desired material. For example, the body 202 can include wood, plastic, foam or any other desired material.

FIG. 2 also shows that the adhesive stick 102 can include an adhesive layer 204. The adhesive layer 204 can include any desired material which will allow the body 202 to adhere to the rear side of the drywall. Additionally or alternatively, the adhesive 204 allows the paper to be placed back in the original position to provide additional structural support to the repair.

FIG. 2 further shows that the adhesive stick 102 can include backer paper 206. The backer paper 206 can include any material which protects the adhesive layer 204 prior to use. For example, the backer paper 206 can include waxed paper or any other desired material. The backer paper 206 is discarded after removal.

Figure 3:
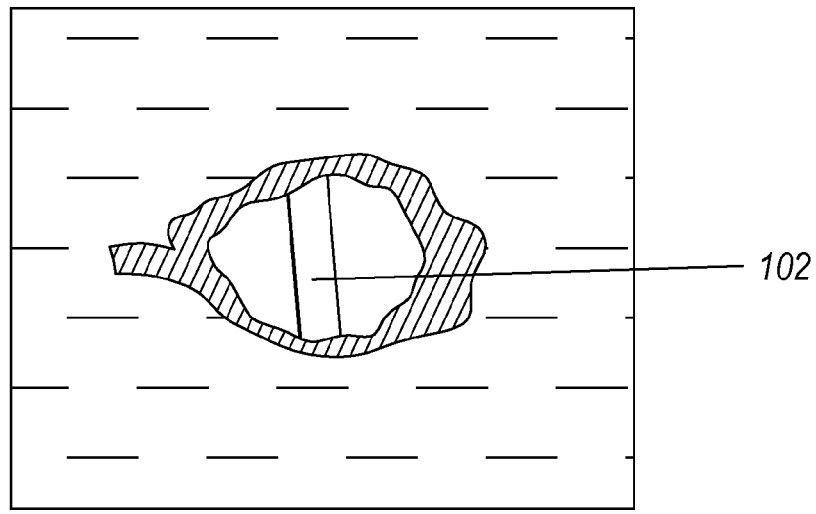
FIG. 3 illustrates an example of a repair being affected using the kit.

FIG. 3 illustrates an example of a repair being affected using the kit 100. FIG. 3 shows that the adhesive stick 102 is placed at the rear of the repair. The adhesive layer on the adhesive stick 102 secures the adhesive stick to the drywall allowing it to remain in place and to provide structural support to the repair.

Figure 4:
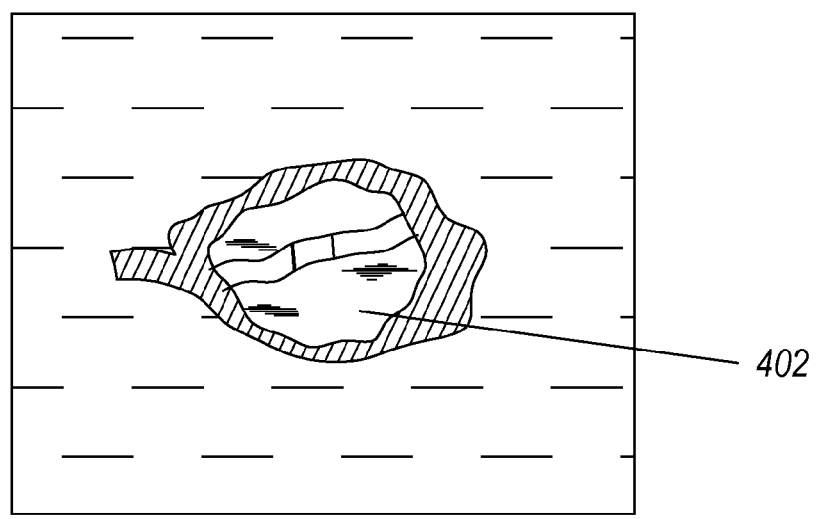
FIG. 4 illustrates an example of the paper of the drywall being adhered to the adhesive stick.

FIG. 4 illustrates an example of the paper 402 of the drywall being adhered to the adhesive stick 102. The paper 402 can be reused as much as possible to provide structural support to the repair. This allows, nails screws, etc. to be placed in the repair and remain effective. That is, using as much of the original drywall paper as possible allows the repair to be used in the same manner as the original repair.

Figure 5:
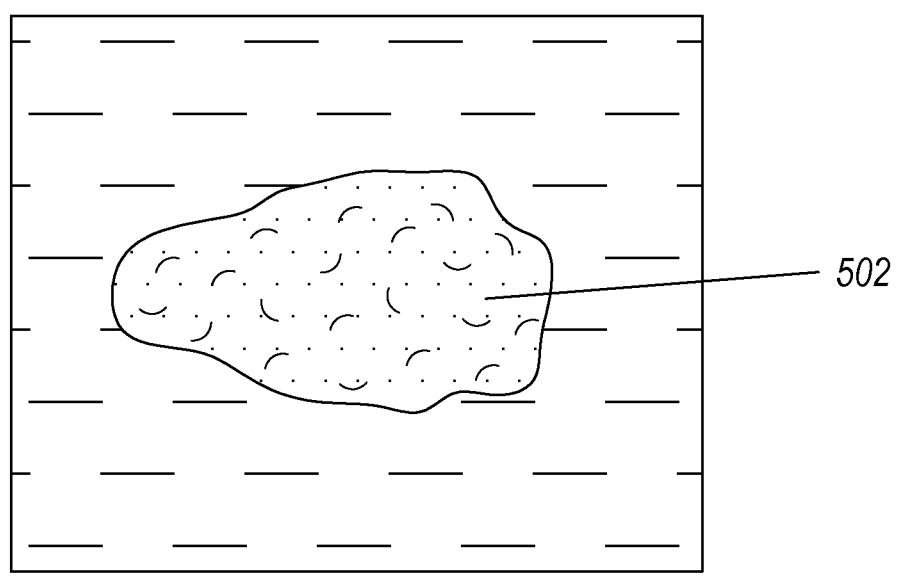
FIG. 5 illustrates an example of the repair plaster repairing the drywall.

FIG. 5 illustrates an example of the repair plaster 502 repairing the drywall. The repair plaster 502 is placed within the break, essentially filling in all of the original drywall material. The repair plaster 502 may then be sanded, painted or otherwise finished to blend the repair with the finish of the existing drywall.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for affecting drywall repair, the method comprising:
   providing a repair plaster powder;
   mixing the repair plaster powder with water to create a repair plaster;
   providing one or more adhesive brace supports, the adhesive brace supports comprising an elongate body having a first end and a second end, the elongate body comprising an adhesive side;
   folding any remaining rear drywall paper from a break in a drywall panel out through an opening in the break towards a front side of the drywall panel;
   placing the one or more adhesive brace supports through the opening in the break to adhere the adhesive brace supports on a rear surface of a drywall panel behind the break in the drywall panel, wherein each adhesive brace support is adhered to the rear surface of the drywall panel such that each end of an adhesive brace support is adhered to opposite sides of the break such that the adhesive brace support runs a length of the break;
   placing the remaining rear drywall paper approximately in the original position by folding the rear drywall paper back through the opening towards a rear side of the drywall panel and adhering it to the one or more adhesive brace supports that run the length of the break;
   placing the repair plaster in the break in the drywall panel; and
   allowing the repair plaster to harden.

2. The method of claim 1, further comprising finishing the front surface of the hardened repair plaster.

3. The method of claim 1, wherein the repair plaster powder comprises fiber to avoid cracking due to shrinking during the hardening process.

4. The method of claim 1, wherein the repair plaster powder comprises gypsum plaster.

5. The method of claim 1, further comprising providing a separate backing plate for inserting into the break and adhering to the adhesive brace supports.

6. The method of claim 1, wherein an adhesive brace support is comprised of a foam core board.

7. The method of claim 1, wherein the one or more adhesive brace supports have a length that is at least two inches beyond the perimeter of the break.

8. The method of claim 1, wherein the repair plaster powder and the one or more adhesive brace supports comprise portions of a wall repair kit, the wall repair kit further comprising:
   an instruction sheet for describing directions on use of the wall repair kit;
   a plastic pouch for holding water to mix with the repair plaster powder to create the repair plaster;
   a plastic packaging bag for holding the repair plaster powder;
   a joint compound to be applied after the repair plaster has set;
   a piece of sandpaper for sanding the joint compound;
   a straw for applying texture to the wall; and
   a box for packaging the repair plaster powder contained in the plastic packaging bag, the one or more adhesive brace supports, the instruction sheet, the plastic pouch, the joint compound, the piece of sandpaper, and the straw.

9. The method of claim 8, wherein the instruction sheet is usable as a backing plate.

10. The method of claim 8, further comprising placing water in the plastic pouch to a predetermined level.

11. The method of claim 10, further comprising adding the water to the plastic packaging bag holding the repair plaster powder and kneading the water/plaster powder compound in the plastic packaging bag to create the repair plaster.

12. The method of claim 11, further comprising cutting a corner of the plastic packaging bag to apply the repair plaster, the corner cut to leave a hole that is at least 0.5 inches in diameter.

13. The method of claim 12, wherein placing the repair plaster comprises squeezing the plastic packaging bag to apply the repair plaster in the break in the drywall panel through the hole in the cut corner.

14. The method of claim 8, wherein at least a portion of the box is useable as a spreading tool for spreading the plaster repair after it is applied to the break in the drywall panel.

15. The method of claim 8, wherein the box is useable as a sanding block for using the sandpaper.

16. The method of claim 8, wherein the plastic pouch is sized such that it holds a volume of water that is equal to an amount of water necessary to produce a repair plaster that has a predefined ratio of water to repair plaster powder.

17. The method of claim 1, wherein the repair plaster powder further comprises a binder to prevent cracking of the repair plaster when it is applied to the break in the drywall panel.

18. The method of claim 1, further comprising removing debris from the break in the drywall panel prior to placing the one or more adhesive brace supports in the opening in the break, the debris comprising one or more of loose and broken pieces of drywall.

\* \* \* \* \*